United States Patent Office 2,805,916
Patented Sept. 10, 1957

---

2,805,916

CONVERSION OF PLUTONIUM TRIFLUORIDE TO PLUTONIUM TETRAFLUORIDE

Sherman Fried, Chicago, Ill., and Norman R. Davidson, Sierra Madre, Calif., assignors to the United States of America as represented by the United States Atomic Energy Commission No Drawing. Application November 25, 1947, Serial No. 788,092

2 Claims. (Cl. 23—14.5)

This invention relates to a process for the preparation of plutonium tetrafluoride.

An object of this invention is to provide a process whereby plutonium tetrafluoride is prepared from plutonium trifluoride.

A further object of this invention is to provide a method whereby a large proportion of the trifluoride of plutonium can be converted in the absence of hydrogen fluoride to the tetrafluoride of plutonium.

Other objects of this invention will become apparent upon further examination of the disclosures herein set forth.

In the practice of this invention, plutonium tetrafluoride is prepared by a process comprising heating plutonium trifluoride with oxygen at a temperature above normal room temperature, suitably at temperatures between 250 and 900° C. and preferably between 300 and 700° C. Inasmuch as the reaction is extremely slow at the lower temperatures and plutonium tetrafluoride tends to decompose if heated beyond 900° C., about 600° C. is the most commonly used temperature region.

The reaction to form plutonium tetrafluoride by oxidation of plutonium trifluoride takes place according to the following equation:

(1) 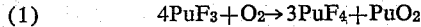 $4PuF_3 + O_2 \rightarrow 3PuF_4 + PuO_2$

From the reaction shown in equation (1) it can be seen that the trifluoride of plutonium reacts with oxygen to form plutonium tetrafluoride and plutonium oxide in a ratio of about 3 to 1.

The oxidation of plutonium trifluoride is carried out under substantially anhydrous conditions and preferably under an oxygen pressure of about one atmosphere in order to obtain the maximum yield of plutonium tetrafluoride by this method. In the absence of water vapor in the oxygen stream, there is no appreciable reaction in the region of 600° C. between the plutonium tetrafluoride produced and the oxygen present in the system. However, in the presence of moisture and in the absence of hydrogen fluoride plutonium tetrafluoride tends to hydrolyze at elevated temperatures to plutonium dioxide as shown by the following equation:

(2) 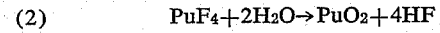 $PuF_4 + 2H_2O \rightarrow PuO_2 + 4HF$

For this reason it is desirable to have all of the embodiments of the process of this invention take place under anhydrous conditions.

The following example is illustrative for the process of this invention.

EXAMPLE I

*Reaction of plutonium trifluoride with oxygen*

A 13.56 mg. sample of plutonium trifluoride placed in a platinum boat within a quartz reaction tube was heated for 1½ hours to 600° C. while in contact with anhydrous oxygen gas. The oxygen used in this experiment was purified by condensation at liquid nitrogen temperatures in a glass bead trap. Prior to the reaction, part of the liquid oxygen was evaporated through the reaction system in order to remove any hydrogen. The purified anhydrous oxygen was then admitted during the reaction at a flow rate of about 10 cc. per minute by regulating the level of liquid oxygen in a Dewar flask surrounding the trap.

The percent of plutonium tetrafluoride present in the resulting product was determined by moistening the product mixture of plutonium tetrafluoride and plutonium dioxide with 6 N nitric acid and igniting in air at 800° C. for four hours to convert the product entirely to plutonium dioxide, the weight loss following ignition indicating the plutonium tetrafluoride content of the original mixture.

After 1½ hours of treatment, the above 13.56 mg. of plutonium trifluoride showed a 0.25 mg. increase corresponding to a 1.84% gain in weight. Further oxygenation at this temperature for an additional 1½ hours failed to produce any change in weight indicating the stability of plutonium tetrafluoride in the presence of oxygen at this temperature. Upon ignition in air with nitric acid the loss was 1.21 mg. which indicated that 62 mol percent of plutonium tetrafluoride had been produced by oxygen treatment of plutonium trifluoride at 600° C.

Following treatment with oxygen for 4½ hours in a manner identical with that just described, a 16.78 mg. sample of plutonium trifluoride placed in a beryllia boat increased 0.32 mg. in weight corresponding to a 1.91% weight gain. On ignition in moist air the observed weight loss was 1.69 mg. indicating that approximately 67.7 mol percent of plutonium tetrafluoride was produced by the oxygen treatment of 16.78 mg. plutonium trifluoride under these conditions.

Analysis of the product mixtures by X-ray diffraction confirmed these results in regard to the percent of plutonium tetrafluoride produced by this method.

The percentage weight loss observed in carrying out the reverse reaction is further corroboration of the probable yield of plutonium tetrafluoride by oxygen treatment of plutonium trifluoride.

A sample of a mixture of plutonium dioxide-plutonium tetrafluoride which had been produced by oxygen treatment of plutonium trifluoride was estimated to contain 50–60% plutonium tetrafluoride and 50–40% plutonium dioxide by X-ray diffraction analysis. On maintaining 11.65 mg. of the above product mixture in vacuo at 600° C. for one hour, the observed weight loss was 0.31 mg. or 2.66% and X-ray diffraction analysis of the material showed about 90% plutonium trifluoride and 10% plutonium dioxide. The theoretical weight loss for a 75% plutonium tetrafluoride-25% plutonium dioxide mixture subjected to identical treatment is 2.63%.

Plutonium tetrafluoride is characterized by X-ray diffraction analysis as being monoclinic with twelve molecules per unit cell. It is further characterized by the following lattice constants determined from the X-ray diffraction pattern:

$$a_1 = 12.6 \pm 0.1 A.$$
$$a_2 = 10.6 \pm 0.1 A.$$
$$a_3 = 8.3 \pm 0.1 A.$$
$$\alpha_2 = 126° \pm 1°.$$

The calculated density is $P = 7.0 \pm 0.2$ gm./cc. Isomorphous tetrafluorides are $ThF_4$, $UF_4$, $CeF_4$, $ZrF_4$ and $HfF_4$.

Inasmuch as plutonium tetrafluoride is not readily soluble nor readily metathesized, the fluoride content was determined by means of the alkaline carbonate-silicate fusion technique. The plutonium content was determined by means of assay methods which included the use of the spectro-photometric cell, potentiometric titration and radiochemical counting.

The atomic ratio of fluorine to plutonium is about 4.3 for plutonium tetrafluoride as shown by each of the above methods of assay. The fluoride content, which exceeds the theoretical value is attributed to the adsorption of hydrogen fluoride by the plutonium tetrafluoride.

The compound, plutonium tetrafluoride, formed by the process of this invention is a compound which is useful both in processes for the separation of plutonium metal from associated fission products and in processes of reduction to obtain plutonium metal.

It will be understood that the process of this invention is capable of extensive modifications and several variation in many respects, and that the preceding example is an illustration only and in no wise to be construed as limitation upon the invention set forth herein, the scope of which is defined in the appended claims.

What is claimed is:

1. The process of preparing plutonium tetrafluoride comprising contacting plutonium trifluoride with oxygen under substantially anhydrous conditions at a temperature between 300° C. and 900° C.

2. The process of claim 1 wherein the reaction takes place at a temperature of approximately 600° C.

References Cited in the file of this patent

Harvey et al.: Jour. of the Chem. Society, August 1947, pp. 1010–1021.